United States Patent [19]

Murray

[11] 4,258,826
[45] Mar. 31, 1981

[54] COMBINATION STEPLADDER AND LOAD LIFTING APPARATUS

[76] Inventor: Douglas J. Murray, 9450 SW. Lehman St., Portland, Oreg. 97223

[21] Appl. No.: 24,795

[22] Filed: Mar. 28, 1979

[51] Int. Cl.³ .................. B62B 1/20; E06C 1/397; E06C 7/16
[52] U.S. Cl. .................. 182/20; 182/103; 187/10; 280/30; 280/47.28
[58] Field of Search .............. 182/20, 103, 102, 16, 182/127; 280/30, 47.29, 47.28, 47.19; 187/10

[56] References Cited

U.S. PATENT DOCUMENTS

| 107,225 | 9/1870 | Claflin | 182/103 |
|---|---|---|---|
| 312,016 | 2/1885 | Price et al. | 280/47.28 |
| 867,754 | 10/1907 | Randall | 280/30 |
| 1,992,108 | 2/1935 | White | 182/16 |
| 2,514,825 | 7/1950 | Zenko | 187/10 |
| 2,588,959 | 3/1952 | Campbell | 182/103 |
| 2,680,027 | 6/1954 | Puydt | 280/47.28 |
| 2,881,865 | 4/1959 | Lewis | 187/10 |
| 2,981,374 | 4/1961 | Holsclaw | 187/10 |
| 3,476,212 | 11/1969 | Eakins | 182/103 |
| 3,490,558 | 1/1970 | Foley | 182/103 |
| 3,578,353 | 5/1971 | Lockhart | 280/47.29 |

*Primary Examiner*—Reinaldo P. Machado
*Attorney, Agent, or Firm*—Clarence O'Brien; Harvey B. Jacobson

[57] ABSTRACT

Two frame sections are hingedly attached at their top and each frame section contains a pair of wheels at the bottom. One of the frame sections consists of a pair of laterally spaced parallel side rails having horizontal steps disposed therebetween. The other frame section contains a pair of parallel spaced channel bars on which ride a vertically movable platform. The platform can be hoisted along the channel bars by use of a hand crank and winch assembly. The two frame sections can be folded together for use as a conventional hand truck or the frame sections can be folded apart and the wheels locked for use as a stepladder.

7 Claims, 8 Drawing Figures

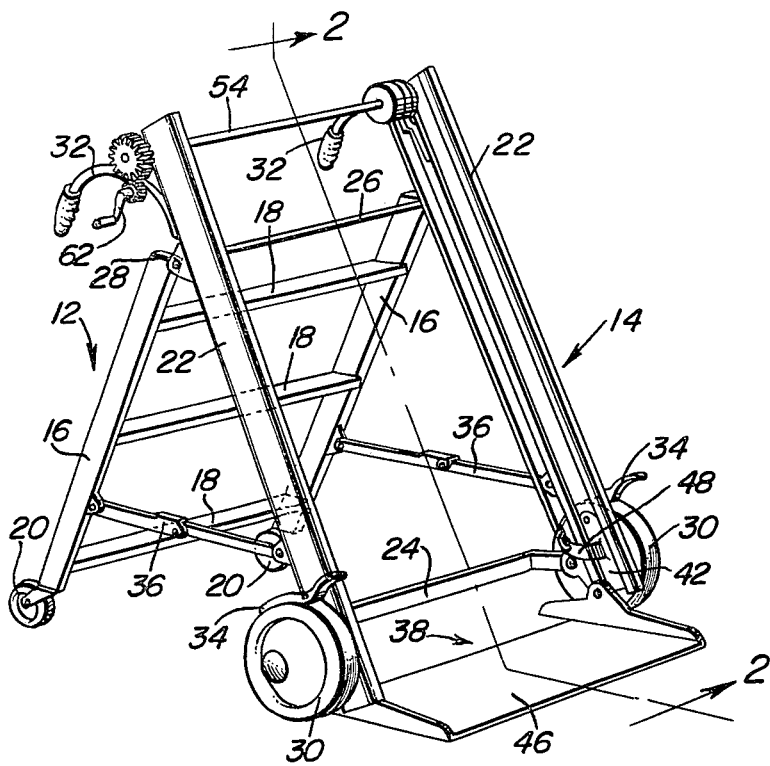
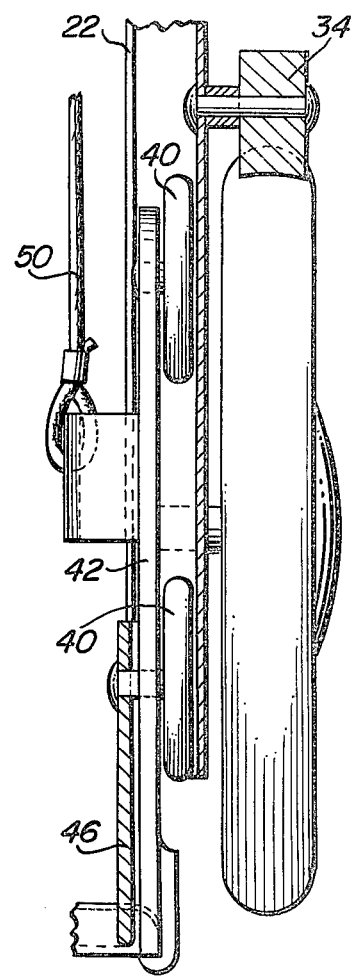
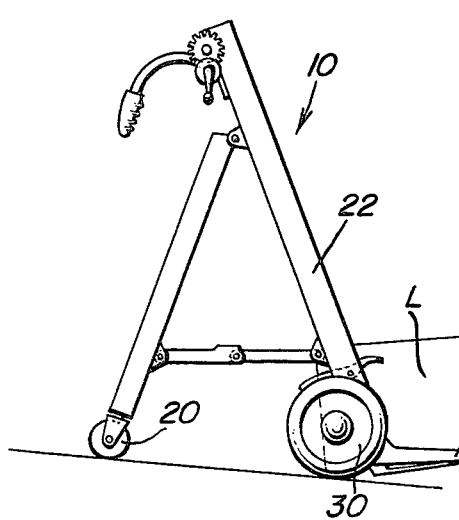
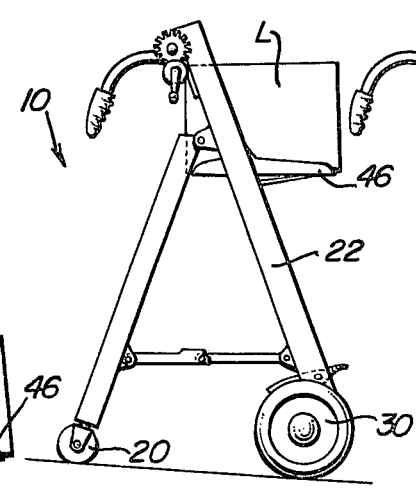
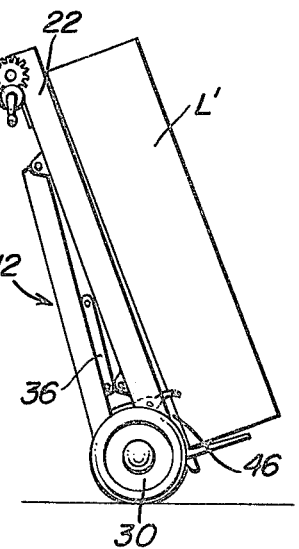

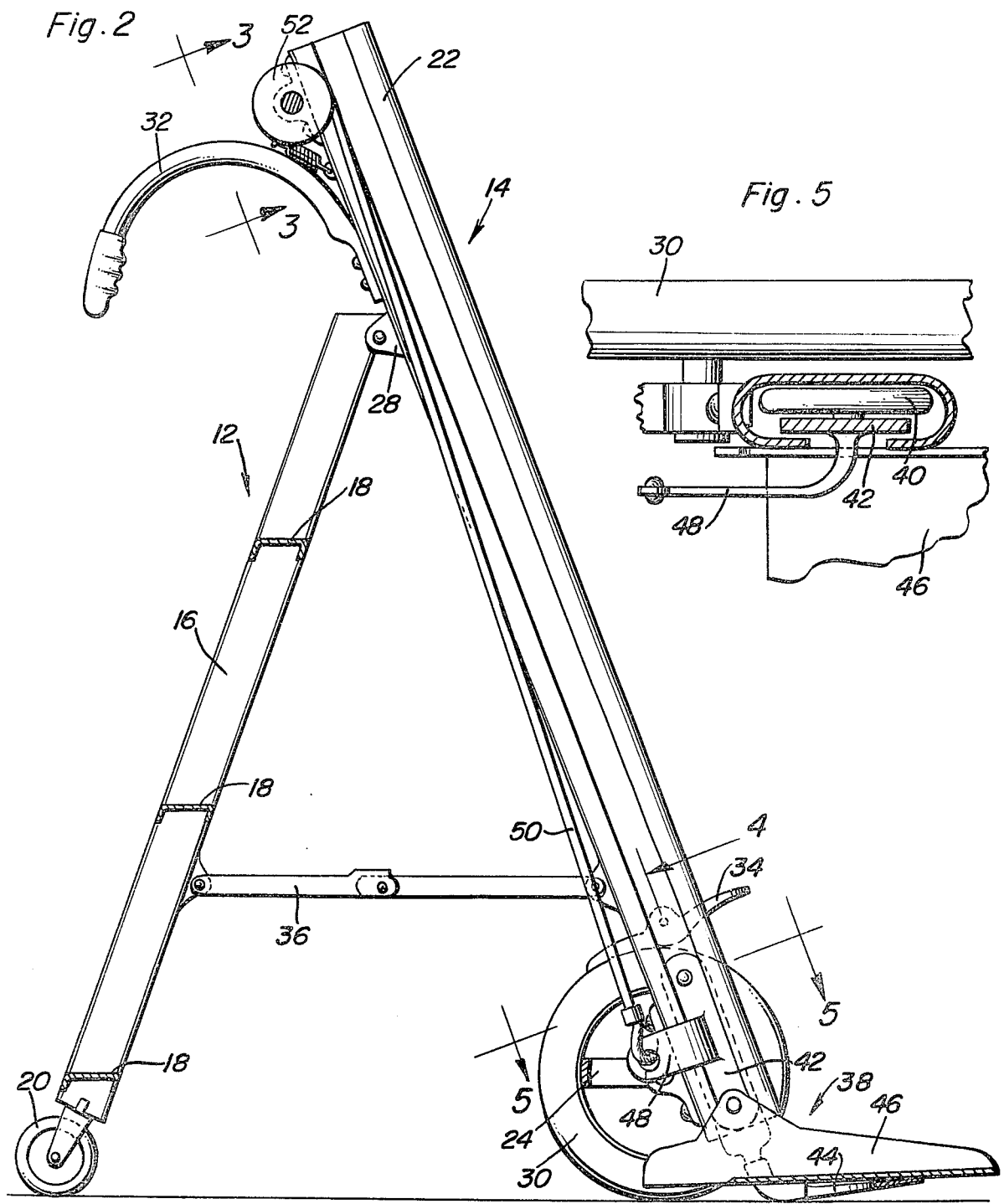
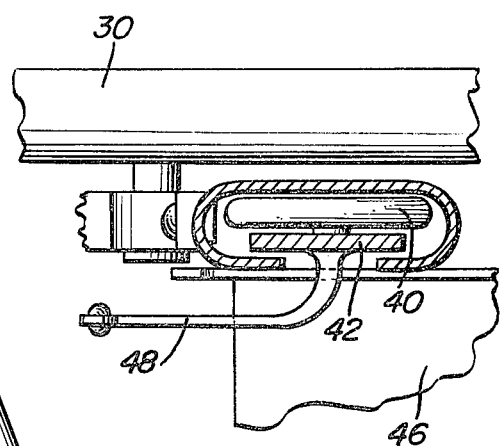
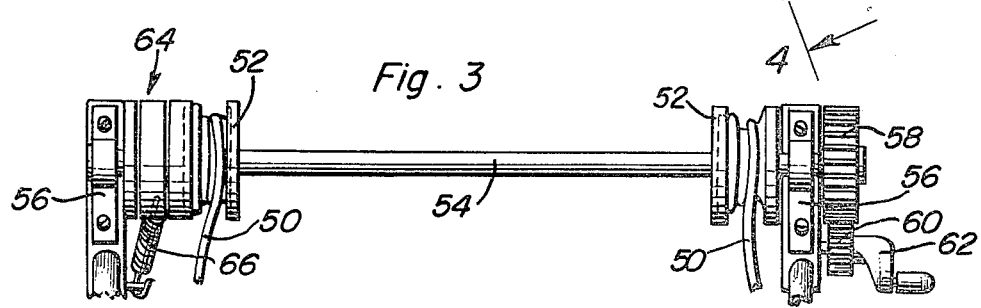

COMBINATION STEPLADDER AND LOAD LIFTING APPARATUS

BACKGROUND OF THE INVENTION

1. Field of the Invention

This invention relates to multi-use hand trucks and especially to such hand trucks which can be used in a four wheel mode of operation for conveying heavy articles, a two wheel mode of operation as a conventional hand truck or in a stepladder mode of operation.

2. Description of the Prior Art

Various combined lifting and load moving devices have been known in the past. For instance, U.S. Pat. No. 107,225, issued Sept. 13, 1870, to Claflin, shows a stepladder having a platform which can be raised on the stepladder by connection to a pulley and winch arrangement. U.S. Pat. No. 2,514,825, issued July 11, 1950, to Zenko, shows a hand truck incorporating a hoist to facilitate the loading and unloading thereof. The hoist comprises a platform connected to the piston of a hydraulic cylinder. The hydraulic cylinder is actuated for raising the platform. U.S. Pat. No. 2,881,865, issued Apr. 14, 1959, to Lewis, shows a hand truck having a crank operated platform on the front thereof. U.S. Pat. No. 2,981,374, issued Apr. 25, 1961, to Holsclaw, shows a hand truck having a pair of laterally spaced channel bars which accept wheels mounted on a vertically displaceable platform. A pair of cables are attached to the platform at one end and are wound around separate spools disposed at the top of the hand truck. The spools are connected to a common shaft which is rotatable by a crank. A brake is also provided for holding the platform at a desired vertical position. U.S. Pat. No. 3,476,212, issued Nov. 4, 1969, to Eakins, shows a stepladder having a vertically movable platform for lifting work to the top of the stepladder. The platform is raised through rotation of a crank. The crank is connected to a worm which rotates a worm gear causing a chain and sprocket drive to lift the platform. U.S. Pat. No. 3,490,558, issued Jan. 20, 1970, to Foley, shows a stepladder scaffold apparatus wherein a stepladder is connected atop a platform having four wheels to facilitate movement of the apparatus. The stepladder itself contains several platforms, the position of which can be adjusted vertically on the stepladder.

SUMMARY OF THE INVENTION

The apparatus includes a ladder portion having two longitudinally extending parallel side rails interconnected by horizontal steps. The top of the ladder is pivotally attached to a pair of spaced channel bars. The channel bars are supported by a pair of large wheels, while the ladder is supported by a pair of caster wheels. A pair of folding brackets connect the lower portions of the ladder and channel bars such that the ladder may be folded against the channel bars or the ladder and channel bars may be disposed in a diverging relationship being held apart by the extended folding brackets. A lifting mechanism is disposed between the channel bars for riding thereon. A pair of roller wheels ride within each channel bar and support a lifting bar. The lifting bar has a flat surface which extends between the channel bars. A folding tray is pivotally attached to the lifting bar and can assume a vertical position wherein it forms a back for the lifting bar or can assume a horizontal position wherein it overlays the lifting bar. The lifting mechanism is attached by a pair of cables to a crank and the winch assembly and the cables are wound around separate spools which are attached to a common shaft. The shaft is rotated through a crank and the gear mechanism. A friction slip clutch is connected to the shaft for holding the tray in a desired vertical disposition. With the ladder folded against the channel rail portion of the device, the apparatus can be used as a standard hand truck with the large rubber wheels supporting a load to be carried. In the folded configuration, the ladder portion is useful as a creeper for pulling the hand truck over stair risers. In the diverging configuration, the wheels of the device can be locked and the apparatus can be used as a stepladder. Furthermore, with the apparatus disposed in the diverging configuration, the angle of the channel rails is designed such that when a load is elevated to its maximum height the outer edge of the folding tray, when in the horizontal position, is even with the outer edge of the wheels so that an operator can push the load flush up against a table or shelf for easy loading and unloading. Furthermore, the load will be centered at a point between the wheels to prevent the apparatus from tipping forward as the load is winched upward.

Accordingly, one object of the present invention is to provide a combination stepladder and load lifting apparatus which can be used to transport loads in both a folded configuration wherein the apparatus is used as a conventional hand truck, or in an unfolded configuration wherein the apparatus gives four wheel support to a load being transported.

Furthermore, an additional object of the present invention is to provide a combination stepladder and load lifting apparatus which includes a lifting bar and folding tray mechanism for providing versatility for lifting various types of loads.

Yet a still further object of the present invention is to provide a combination stepladder and load lifting apparatus which can be used to lift loads when in the unfolded configuration and wherein the load lifting mechanism is positioned such that a load being lifted will be positioned between the wheels of the apparatus for insuring stability of the apparatus.

Yet an even still further object of the present invention is to provide a combination stepladder and load lifting apparatus which includes brakes for holding the apparatus steady while in use as a stepladder.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the combination stepladder and load lifting apparatus in the unfolded position.

FIG. 2 is an elevational sectional view taken substantially along a plane passing through section line 2—2 of FIG. 1.

FIG. 3 is a sectional view taken substantially along a plane passing through section line 3—3 of FIG. 2 showing the pulley and clutch mechanism of the present invention.

FIG. 4 is a sectional view taken substantially along a plane passing through section line 4—4 of FIG. 2 showing the steel rollers disposed in one channel rail.

FIG. 5 is a sectional view taken substantially along a plane passing through section line 5—5 of FIG. 2 showing a portion of the cable clip and lifting bar of the invention.

FIG. 6 is a side elevational view of the combination stepladder and lifting apparatus shown with a load disposed in its lowest position on the folding tray.

FIG. 7 is a side elevational view of the combination stepladder and load lifting apparatus shown with a load disposed in the highest vertical position on the folding tray.

FIG. 8 is a side elevational view of the combination stepladder and load lifting apparatus shown in use as a hand truck.

DESCRIPTION OF THE PREFERRED EMBODIMENT

Now with reference to the drawings, the combination stepladder and load lifting apparatus, generally referred to by the numeral 10, will be described in detail. Especially with reference to FIGS. 1 and 2, it can be seen that the apparatus includes a ladder portion 12 which is hingedly mounted to the lifting portion 14. The ladder 12 includes a pair of side rails 16 which are interconnected by steps 18. The ladder portion is supported by caster wheels 20 which are connected to the bottom of each side rail 16.

The lifting portion 14 comprises a pair of laterally spaced channel rails 22 which are fixed in position relative to each other by a lower brace 24 and an upper brace 26. Upper brace 26 extends between a pair of bosses 28 and mounts the upper ends of side rails 16 to form a pivotal connection between the ladder portion 12 and the lifting portion 14. Channel rails 22 are supported at their lower ends by large wheels 30 which, together with wheels 20, provide mobility for the entire apparatus. A pair of rearwardly extending handles 32 are fixedly attached to the tops of the channel rails and provide a means for controlling the motion of the apparatus. Brake levers 34 are pivotally mounted on the channel rails 22 and can be angularly displaced for locking wheels 30 in position, when desired. A pair of folding brackets 36 are mounted between channel rails 22 and side rails 16 on opposite sides of the apparatus for holding the two portions in fixed, diverging relation to each other, when needed. The folding brackets are standard items wherein the center may be moved upwardly for allowing the two portions of the apparatus to be moved together, as shown in FIG. 8.

Now with reference to FIGS. 1 through 5, it can be seen that a lifting mechanism 38 is mounted to the channel bars 22 for lifting a load therealong. Lifting mechanism 38 includes a pair of steel roller wheels 40 which are tandemly mounted within each of the channel bars. Each pair of roller wheels 40 is rotatively affixed to a tie plate 42 from the bottom of which lifting bar 44 extends outwardly. Lifting bar 44 extends entirely between the tie plates 42 and is firmly fixed in position thereon. Pivotally mounted between the tie plates 42 is a steel folding tray 46 which can be positioned horizontally on top of the lifting bar 44 as shown in the drawings or can be pivoted upwardly between the channel bars for providing a backing to hold a load on the lifting bar 44. In order to move the lifting mechanism 38 upwardly between the channel rails, a cable clip 48 is attached to each tie bar and extends rearwardly thereof. A steel cable 50 is connected to each cable clip 48. Cables 50 wrap around separate cable spools 52 which are mounted on a common rotatable shaft 54. Shaft 54 is mounted and journaled on the individual channel rails 22 by bearings 56. The shaft extends outwardly on one side and has a gear 58 mounted thereon. Gear 58 cooperates with a smaller gear 60 which is mounted on crank 62. Accordingly, by rotation of crank 62, lifting mechanism 38 will be raised along the channel bars carrying any load disposed thereon. A friction slip clutch brake 64 is also mounted on shaft 52 and is connected to one of the channel rails 22 through spring 66. Brake 64 is operative to provide sufficient friction to inhibit downward motion of the lifting mechanism 38 under the weight of a load disposed thereon. Of course the friction of brake 64 is insufficient to stop the movement of the shaft 54 by use of crank 62. Alternatively, a ratchet or similar mechanism can be used for controlling the positioning of lifting mechanism 38.

FIGS. 6 and 7 show the apparatus 10 in use lifting a load L. It will be noted that as the load L is hoisted upward between the channel bars 22, the center of gravity of the load is moved further rearward of wheels 30 so as to be positioned between wheels 30 and wheels 20. In this manner, the tendency of the apparatus to tip over due to raising of the load thereon is reduced. Furthermore, as seen in FIG. 7, the front of the load L and tray 46 are disposed immediately over the front of wheels 30, thus allowing the load and tray to be moved directly up to a table or platform to facilitate the unloading of the apparatus. It will be noted that tray 46 is in its horizontal position for use in lifting load L. In FIG. 8, it can be seen that tray 46 is disposed in its vertical position, thus providing a backrest for package L' while the package is being lifted on lifting bar 44. In FIG. 8, it will be seen that folding brackets 36 have been released and ladder portion 12 is positioned in its folded configuration against channel bars 22. It will be noted that with the ladder portion in this mode of operation, the rear of side rails 16 are disposed just forwardly of the rear of wheels 30 thereby enabling their use as a creeper to facilitate movement of the apparatus over stair risers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combination stepladder and load lifting apparatus comprising in combination:
    a ladder portion having side rails and steps disposed between the side rails;
    a first pair of wheels attached to the bottom of said ladder portion;
    a load lifting portion pivotally attached to the top of said ladder portion, said lifting portion including longitudinal side members;
    a second set of wheels attached at the bottom of said side members; and
    load lifting means attached to said lifting portion and mounted between said side members, said load lifting means including a first lifting platform and a second lifting platform hingedly attached for disposition in a first surmounting position over said first platform and a second position rising upwardly from said first platform to form a back for said first platform, and, a connection cable attached to said first and second lifting platforms at one end and a cable spool attached to the opposite end of said cable, a hand crank connected to said cable spool for rotating said cable spool to draw said lifting platforms along said side members.

2. The combination of claim 1 and further including folding bracket means extending between said ladder portion and said load lifting portion for holding said ladder portion and said load lifting portion in a first mutually diverging relation, and allowing the ladder portion and load lifting portion to assume a second, side-by-side, relation.

3. The combination of claim 1 wherein one of said sets of wheels includes brake means for holding said wheels stationary.

4. The combination of claim 1 and further including a brake means connected to said cable spool for inhibiting gravity induced movement of said lifting platforms.

5. The combination of claim 1 wherein said side members are channel bars and further wherein said lifting means includes a pair of wheels disposed in each of said channel bars for allowing sliding motion of said lifting means within said channel bars.

6. The combination of claim 7 and further including a pair of handles with one handle connected to and extending from each of said channel bars.

7. The combination of claim 2 wherein said ladder portion is disposed slightly forward of the rear edge of the second set of wheels when in said second, side-by-side, relation for providing a creeper for use on stair risers.

* * * * *